United States Patent
Symes, Jr.

(10) Patent No.: US 10,287,211 B2
(45) Date of Patent: May 14, 2019

(54) LOW-K AND MID-K LTCC DIELECTRIC COMPOSITIONS AND DEVICES

(71) Applicant: Ferro Corporation, Mayfield Heights, OH (US)

(72) Inventor: Walter J. Symes, Jr., Dundee, NY (US)

(73) Assignee: Ferro Corporation, Mayfield Heights, OH (US)

( * ) Notice: Subject to any disclaimer, the term of this patent is extended or adjusted under 35 U.S.C. 154(b) by 0 days.

(21) Appl. No.: 15/550,101

(22) PCT Filed: Feb. 17, 2016

(86) PCT No.: PCT/US2016/018190
§ 371 (c)(1),
(2) Date: Aug. 10, 2017

(87) PCT Pub. No.: WO2016/137790
PCT Pub. Date: Sep. 1, 2016

(65) Prior Publication Data
US 2018/0022650 A1    Jan. 25, 2018

Related U.S. Application Data

(60) Provisional application No. 62/222,254, filed on Sep. 23, 2015, provisional application No. 62/132,632, filed on Mar. 13, 2015, provisional application No. 62/121,582, filed on Feb. 27, 2015.

(51) Int. Cl.
*C04B 35/495* (2006.01)
*C04B 35/626* (2006.01)

(52) U.S. Cl.
CPC ........ *C04B 35/495* (2013.01); *C04B 35/6262* (2013.01); *C04B 35/62685* (2013.01); *C04B 2235/3203* (2013.01); *C04B 2235/3208* (2013.01); *C04B 2235/3213* (2013.01); *C04B 2235/3215* (2013.01); *C04B 2235/3232* (2013.01); *C04B 2235/3236* (2013.01); *C04B 2235/3258* (2013.01); *C04B 2235/3281* (2013.01); *C04B 2235/3284* (2013.01); *C04B 2235/3409* (2013.01); *C04B 2235/3418* (2013.01); *C04B 2235/3436* (2013.01); *C04B 2235/445* (2013.01); *C04B 2235/5445* (2013.01); *C04B 2235/72* (2013.01); *C04B 2235/77* (2013.01)

(58) Field of Classification Search
CPC .................................................. C04B 35/495
See application file for complete search history.

(56) References Cited

U.S. PATENT DOCUMENTS

| | | |
|---|---|---|
| 4,379,319 A | 4/1983 | Wilson |
| 4,540,676 A | 9/1985 | Chu et al. |
| 4,816,430 A | 3/1989 | Chu |
| 4,882,305 A | 11/1989 | Chu et al. |
| 5,258,335 A | 11/1993 | Muralidhar et al. |
| 5,296,426 A | 3/1994 | Bum |
| 5,571,767 A | 11/1996 | Wilson et al. |
| 5,601,673 A | 2/1997 | Alexander |
| 5,661,882 A | 9/1997 | Alexander |
| 5,790,367 A | 8/1998 | Mateika et al. |
| 5,841,625 A | 11/1998 | Hennings et al. |
| 5,994,253 A | 11/1999 | Sasaki et al. |
| 6,043,174 A | 3/2000 | Maher et al. |
| 6,078,494 A | 6/2000 | Hansen |
| 6,185,087 B1 | 2/2001 | Park et al. |
| 6,723,673 B2 | 4/2004 | Maher et al. |
| 7,161,795 B1 | 1/2007 | Megherhi et al. |
| 7,230,817 B2 | 6/2007 | Megherhi et al. |
| 7,521,390 B2 | 4/2009 | Symes, Jr. et al. |
| 7,541,306 B2 | 6/2009 | Koebrugge et al. |
| 7,858,548 B2 | 12/2010 | Symes, Jr. et al. |
| 8,043,721 B2 | 10/2011 | Khadilkar et al. |
| 8,305,731 B2 | 11/2012 | Symes, Jr. et al. |
| 10,065,894 B2 | 9/2018 | Symes, Jr. |
| 2007/0018776 A1 | 1/2007 | Tanaka et al. |
| 2016/0240313 A1 | 8/2016 | Symes, Jr. |
| 2018/0170813 A1* | 6/2018 | Symes, Jr. ............ C04B 35/495 |

FOREIGN PATENT DOCUMENTS

| | | |
|---|---|---|
| JP | 10294020 | 11/1998 |
| KR | 2003-0052461 | 6/2003 |
| WO | 2016/137790 A1 | 9/2016 |

OTHER PUBLICATIONS

International Search Report for corresponding PCT/US2016/018190 dated Jun. 2, 2016, one page.
Espacenet bibliographic data for JPH10294020 published Nov. 4, 1998, one page.
Machine translation of KR20030052461 published Jun. 27, 2003, six pages.

* cited by examiner

*Primary Examiner* — Karl E Group
(74) *Attorney, Agent, or Firm* — Rankin, Hill & Clark LLP

(57) ABSTRACT

LTCC devices are produced from dielectric compositions comprising a mixture of precursor materials that, upon firing, forms a dielectric material comprising a barium-tungsten-silicon host.

12 Claims, No Drawings

LOW-K AND MID-K LTCC DIELECTRIC COMPOSITIONS AND DEVICES

BACKGROUND OF THE INVENTION

1. Field of Invention

This invention relates to dielectric compositions, and more particularly to barium-silicon-tungstate based dielectric compositions that exhibit a dielectric constant K=6-12 or alternately up to about 50, with very high Q factor and that can be used in low temperature co-fired ceramic (LTCC) applications with noble metal metallizations.

2. Description of Related Art

The state of the art materials used in LTCC systems for wireless applications use dielectrics with dielectric constant K=4-8 and with Q factors around 500-1,000 at the measuring frequency of 1 MHz. This is generally achieved by using a ceramic powder mixed with a high concentration of a $BaO—CaO—B_2O_3$ low softening temperature glass which allows the low temperature densification (875° C. or lower) of the ceramic. This large volume of glass can have the undesirable effect of lowering the Q value of said ceramic.

SUMMARY OF THE INVENTION

This invention relates to dielectric compositions, and more particularly to a Barium-Silicon-Tungstate based dielectric compositions that exhibit a dielectric constant K=6-12 or alternately of up to 50, for example about 1 to about 50, or about 6 to about 45 with very high Q factor and that can be used in low temperature co-fired ceramic (LTCC) applications with noble metal metallizations. Q factor=1/Df, where Df is the dielectric loss tangent. There is growing demand for dielectric materials with very high Q values greater than 1,000 for high frequency applications.

The invention also relates to a dielectric material composition that when fired to a dense ceramic body meets industry standards for COG specification while maintaining high Q values, for example Q values (at a measuring frequency of 1 MHz) of greater than 1000, 2000, 5000, 10000, 15000, 20000, 30000, 40000, 50000 or any value between the foregoing, or even higher.

Broadly, the ceramic material of the invention includes a host which is made by mixing the appropriate amounts of $BaCO_3$, $WO_3$ and $SiO_2$, milling these materials together in an aqueous medium to a particle size $D_{50}$ of about 0.2 to 1.5 microns. This slurry is dried and calcined at about 800 to 1000° C. for about 1 to 5 hours to form the host material including BaO, $WO_3$ and $SiO_2$. The resultant host material is then mechanically pulverized and mixed with fluxing agents and again milled in an aqueous medium to a particle size $D_{50}$ of about 0.5 to 1.0 μm. The milled ceramic powder is dried and pulverized to produce a finely divided powder. The resultant powder can be pressed into cylindrical pellets and fired at temperatures of about 775 to about 900° C., preferably about 800 to about 890° C., more preferably about 800 to about 875° C., more preferably about 825 to about 875° C., alternately about 845 to about 885° C., and even more preferably about 840 to about 860° C. or 850° C. to 860° C. The most preferable single values are 850° C. or 880° C. The firing is conducted for a time of about 1 to about 200 minutes, preferably about 5 to about 100 minutes, more preferably about 10 to about 50 minutes, still more preferably about 20 to about 40 minutes and most preferably for about 30 minutes.

An embodiment of the invention is a composition comprising a mixture of precursor materials that, upon firing, forms a barium-tungsten-silicon oxide host material that is lead-free and cadmium-free and can, by itself, or in combination with other oxides, form a dielectric material.

In a preferred embodiment, the host material includes no lead. In an alternate preferred embodiment, the host material includes no cadmium. In a more preferred embodiment, the host material includes no lead and no cadmium.

In a preferred embodiment, the host material comprises (i) 30-45 wt %, preferably 37-44 wt % BaO, (ii) 50-60 wt %, preferably 51-58 wt % $WO_3$, and (iii) 1-10 wt %, preferably 3-7 wt % $SiO_2$.

In a preferred embodiment, the host material comprises (i) 30-50 wt %, preferably 30-45 wt %, more preferably 37-44 wt % BaO, (ii) 40-70 wt %, preferably 45-65 wt %, more preferably 51-58 wt % $WO_3$, and (iii) 0.1-15 wt %, preferably 1-10 wt %, more preferably 3-7 wt % $SiO_2$.

In a preferred embodiment, the host material comprises (i) 30-50 wt %, preferably 30-45 wt %, more preferably 37-44 wt % BaO, (ii) 40-70 wt %, preferably 45-65 wt %, more preferably 51-58 wt % $WO_3$, and (iii) 0.1-15 wt %, preferably 1-10 wt %, and more preferably 3-7 wt % $SiO_2$.

In another embodiment, a dielectric composition includes any host material disclosed elsewhere herein together with 5-15 wt % $BaSiO_3$, 0.1-4 wt % $BaCO_3$, 0.1-4 wt % $H_3BO_3$, and 0.1-2 wt % LiF, or equivalents of the foregoing. Up to 1 wt % CuO may optionally be included.

In a preferred embodiment, a dielectric composition includes any host material disclosed elsewhere herein together with 8-13 wt % $BaSiO_3$, 0.5-3 wt % $BaCO_3$, 0.5-3 wt % $H_3BO_3$, and 0.1-1 wt % LiF, or equivalents of the foregoing. Up to 0.5 wt % CuO may optionally be included. In a further preferred embodiment, a dielectric composition includes any host material disclosed elsewhere herein together with 9-11 wt % $BaSiO_3$, 1-2 wt % $BaCO_3$, 1-2 wt % $H_3BO_3$, and 0.2-0.9 wt % LiF, or equivalents of the foregoing. Also, up to 0.5 wt % CuO may optionally be included, for example 0.1 to 5 wt %.

In another embodiment, a dielectric composition of the invention includes 90-99.9 wt % of any host material herein, together with 0.2-3 wt % $BaCO_3$, 0-3 wt % $H_3BO_3$, 0.1 wt % LiF, 0-0.5 wt % CuO, 0-1.5 wt % $Li_2CO_3$ and 0-1 wt % $SiO_2$, or oxide equivalents of any of the foregoing. In all embodiments in this paragraph, the host material is present at 70-99.99 wt %, preferably 75-99.9 wt %, more preferably 80-99.9 wt %, and still more preferably 90-99.9 wt % of the dielectric composition. In a still more preferred embodiment, a dielectric composition includes any host material disclosed elsewhere herein together with 10-11 wt % $BaSiO_3$, 1.2-1.8 wt % $BaCO_3$, 1.1-1.7 wt % $H_3BO_3$, and 0.3-0.8 wt % LiF, or equivalents of the foregoing. As is known in the art, equivalent means the finally fired oxide form of a metal, such as, for example, $B_2O_3$, relative to $H_3BO_3$ or BaO relative to $BaCO_3$.

In another embodiment, a dielectric composition includes any host material disclosed elsewhere herein together with 0.1-3 wt % $BaCO_3$ and 0.5-4 wt % $H_3BO_3$ or equivalents of the foregoing. Up to 2 wt % LiF, 1 wt % CuO, up to 2 wt % $Li_2CO_3$, and/or up to 2 wt % $SiO_2$ may optionally be included. In a preferred embodiment, a dielectric composition includes any host material disclosed elsewhere herein together with 0.5-2 wt % $BaCO_3$ and 0.7-2 wt % $H_3BO_3$, or equivalents of the foregoing. Up to 1 wt % LiF, 0.5 wt %

CuO, up to 1 wt % Li$_2$CO$_3$, and/or up to 1 wt % SiO$_2$ may optionally be included. In all embodiments in this paragraph, the host material is present at 80-99.99 wt %, preferably 85-99.9 wt % and more preferably 90-99 wt % of the dielectric composition. In a still more preferred embodiment, a dielectric composition includes any host material disclosed elsewhere herein together with 1.2-1.8 wt % BaCO$_3$, 1.1-1.7 wt % H$_3$BO$_3$, and 0.3-0.8 wt % LiF, or equivalents of the foregoing.

In another embodiment, a dielectric composition includes any host material disclosed elsewhere herein together with 0.5-2 wt % BaCO$_3$ and 0.1-2 wt % H$_3$BO$_3$, and 0.1-1 wt % Li$_2$CO$_3$, or equivalents of the foregoing. Up to 2 wt % LiF, up to 1 wt % CuO, up to 7 wt % SiO$_2$, up to 2 wt % ZrO$_2$ and up to 15 or up to 50 wt % CaTiO$_3$ may optionally be included. In a preferred embodiment, a dielectric composition includes any host material disclosed elsewhere herein together with 0.8-1.5 wt % BaCO$_3$ and 0.3-1 wt % H$_3$BO$_3$, and 0.1-0.8 wt % Li$_2$CO$_3$, or equivalents of the foregoing. Up to 1 wt % LiF, 0.5 wt % CuO, 5 wt % SiO$_2$, 1 wt % ZrO$_2$ and/or 10 wt % CaTiO$_3$ may optionally be included. In such embodiments, the host material is present at 80-99.99 wt %, preferably 85-99.9 wt % and more preferably 84-99 wt % of the dielectric composition.

In another embodiment, a dielectric composition includes any host material disclosed elsewhere herein together with 0.2-2 wt % BaCO$_3$ and 0.5-5 wt % H$_3$BO$_3$, and 0.1-2 wt % Li$_2$CO$_3$, and 0.01-0.5 wt % SiO$_2$, and 1-10 wt % ZnO, and 0.1-3 wt % CuO, and 30-50 wt % CaTiO$_3$, or equivalents of the foregoing. In a preferred embodiment, a dielectric composition includes any host material disclosed elsewhere herein together with 0.5-1 wt % BaCO$_3$ and 2-4 wt % H$_3$BO$_3$, and 0.5-1.4 wt % Li$_2$CO$_3$, and 0.03-0.07 wt % SiO$_2$, and 5-8 wt % ZnO, and 0.3-0.7 wt % CuO, and 35-45 wt % CaTiO$_3$, or equivalents of the foregoing. In such embodiments, the host material is present at 30-60 wt %, preferably 40-55 wt %, and more preferably 45-50 wt % of the dielectric composition.

In another embodiment, a dielectric composition includes (a) 20-70 wt % BaO, (b) 20-70 wt % WO$_3$, (c) 0.1-10 wt % SiO$_2$, (d) 0-10 wt % CaO, (d) 0-10 wt % TiO$_2$, (e) 0.1-5 wt % B$_2$O$_3$, (f) 0.1-5 wt % Li$_2$O, and (g) 0-5 wt % LiF.

In another embodiment, a dielectric composition includes (a) 20-70 wt % BaO, (b) 20-70 wt % WO$_3$, (c) 0.1-10 wt % SiO$_2$, (d) 1-15 wt % SrO, (d) 0.1-10 wt % TiO$_2$, (e) 0.1-5 wt % B$_2$O$_3$, (f) 0.1-5 wt % Li$_2$O, and (g) 0.1-1 wt % CuO.

An embodiment of the invention is a lead-free and cadmium-free dielectric composition comprising, prior to firing (a) 80-99 wt % of a host material comprising (i) 30-45 wt % BaO, (ii) 50-60 wt % WO$_3$, (iii) 1-10 wt % SiO$_2$, (iv) no lead, and (v) no cadmium together with (b) 8-13 wt % BaSiO$_3$, (c) 0.5-3 wt % BaCO$_3$, (d) 0.5-3 wt % H$_3$BO$_3$, (e) 0.1-1 wt % LiF and (f) 0 to 0.5 wt % CuO, or oxide equivalents of any of the foregoing.

An embodiment of the invention is a lead-free and cadmium-free dielectric composition comprising, prior to firing (a) 90-99.9 wt % of a host material comprising (i) 30-45 wt % BaO, (ii) 50-60 wt % WO$_3$, (iii) 1-10 wt % SiO$_2$, (iv) no lead, and (v) no cadmium together with (b) 0.5-2 wt % BaCO$_3$, (c) 1-3 wt % H$_3$BO$_3$, (d) 0.1-1 wt % LiF and (e) 0 to 0.5 wt % CuO, 0-1 wt % Li$_2$CO$_3$, and 0-1 wt % SiO$_2$, or oxide equivalents of any of the foregoing.

An embodiment invention is a lead-free and cadmium-free dielectric composition comprising, prior to firing (a) 87-99.9 wt % of a host material comprising (i) 30-45 wt % BaO, (ii) 50-60 wt % WO$_3$, (iii) 1-10 wt % SiO$_2$, (iv) no lead, and (v) no cadmium together with (b) 0.8-1.5 wt % BaCO$_3$, (c) 0.3-1 wt % H$_3$BO$_3$, (d) 0-1 wt % LiF and (e) 0 to 0.5 wt % CuO, (f) 0.1-0.8 wt % Li$_2$CO$_3$, (g) 0.1-0.7 wt % SiO$_2$, (h) 0-1 wt % ZrO$_2$, (i) 0-10 wt % CaTiO$_3$ or oxide equivalents of any of the foregoing.

An embodiment of the invention is a lead-free and cadmium-free dielectric composition comprising, prior to firing (a) 37-99.7 wt % of a host material comprising (i) 30-50 wt % BaO, (ii) 45-65 wt % WO$_3$, (iii) 1-10 wt % SiO$_2$, (iv) no lead, and (v) no cadmium together with (b) 0.1-2 wt % BaCO$_3$, (c) 0.1-5 wt % H$_3$BO$_3$, (d) 0-1 wt % CuO, (e) 0.1-2 wt % Li$_2$CO$_3$, (f) 0-5 wt % SiO$_2$, (g) 0-1 wt % ZrO$_2$, (h) 0-10 wt % CaTiO$_3$ or oxide equivalents of any of the foregoing.

An embodiment invention is a lead-free and cadmium-free dielectric composition comprising, prior to firing (a) 87-99.9 wt % of a host material comprising (i) 30-45 wt % BaO, (ii) 50-60 wt % WO$_3$, (iii) 1-10 wt % SiO$_2$, (iv) no lead, and (v) no cadmium together with (b) 0.8-1.5 wt % BaCO$_3$, (c) 0.3-1 wt % H$_3$BO$_3$, (d) 0-1 wt % LiF and (e) 0 to 0.5 wt % CuO, (f) 0.1-0.8 wt % Li$_2$CO$_3$, (g) 0.5 wt % SiO$_2$, (h) 0-1 wt % ZrO$_2$, (i) 0-10 wt % CaTiO$_3$ or oxide equivalents of any of the foregoing. HEREHEREHERE An embodiment invention is a lead-free and cadmium-free dielectric composition comprising, prior to firing (a) 85-99 wt % of a host material comprising (i) 30-45 wt % BaO, (ii) 50-60 wt % WO$_3$, (iii) 1-10 wt % SiO$_2$, (iv) no lead, and (v) no cadmium together with (b) 0.7-1.7 wt % BaCO$_3$, (c) 0.1-1 wt % H$_3$BO$_3$, (d) 0.1-1 wt % LiF (e) 0 to 0.7 wt % CuO, (f) 0.1-0.8 wt % Li$_2$CO$_3$, (g) 0.01-0.6 wt % SiO$_2$, (i) 4-13 ZnO, (i) 0-15 wt % SrTiO$_3$, (j) 0-50 wt % CaTiO$_3$, or oxide equivalents of any of the foregoing.

An embodiment of the invention is a lead-free and cadmium-free dielectric composition comprising: (a) 10-55 wt % BaO, (b) 15-60 wt % WO$_3$, (c) 0.5-15 wt % SiO$_2$, (d) 0-27 wt % CaO, (e) 0-35 wt % TiO$_2$, (f) 0-15 wt % SrO, (g) 0.05-5 wt % B$_2$O$_3$, (h) 0.05-5 wt % Li$_2$O, (i) 0-5 wt % LiF, (j) 0-5 wt % CuO, and (k) 0-10 wt % ZnO.

An embodiment of the invention is a lead-free and cadmium-free dielectric composition comprising: (a) 20-70 wt % BaO, (b) 20-70 wt % WO$_3$, (c) 0.1-10 wt % SiO$_2$, (d) 0-10 wt % CaO, (e) 0-10 wt % TiO$_2$, (f) 0.1-5 wt % 8203, (g) 0.1-5 wt % Li$_2$O$_3$, and h) 0.05-5 wt % Li$_2$O, (i) 0-5 wt % LiF, (j) 0-5 wt % CuO, and (k) 0-10 wt % ZnO.

For each compositional range bounded by zero weight percent, the range is considered to also teach a range with a lower bound of 0.01 wt % or 0.1 wt %. A teaching such as 60-90 wt % Ag+Pd+Pt+Au means that any or all of the named components can be present in the composition in the stated range.

In another embodiment, the invention relates to a lead-free and cadmium-free dielectric composition, comprising, prior to firing, any host material disclosed elsewhere herein.

In another embodiment, the present invention relates to an electric or electronic component comprising, prior to firing, any dielectric paste disclosed herein, together with a conductive paste comprising: (a) 60-90 wt % Ag+Pd+Pt+Au, (b) 1-10 wt % of an additive selected from the group consisting of silicides, carbides, nitrides, and borides of transition metals, (c) 0.5-10 wt % of at least one glass frit, and (d) 10-40 wt % of an organic portion. The electric or electronic component may be high Q resonators, band pass filters, wireless packaging systems, and combinations thereof.

In another embodiment, the present invention relates to a method of forming an electronic component comprising: applying any dielectric paste disclosed herein to a substrate; and firing the substrate at a temperature sufficient to sinter the dielectric material.

In another embodiment, the present invention relates to a method of forming an electronic component comprising applying particles of any dielectric material disclosed herein to a substrate and firing the substrate at a temperature sufficient to sinter the dielectric material.

In another embodiment, a method of the invention includes forming an electronic component comprising:

(a1) applying any dielectric composition disclosed herein to a substrate or (a2) applying a tape comprising any dielectric composition disclosed herein to a substrate or (a3) compacting a plurality of particles of any dielectric composition disclosed herein to form a monolithic composite substrate; and (b) firing the substrate at a temperature sufficient to sinter the dielectric material.

A method according to the invention is a method of co-firing at least one layer of any dielectric material disclosed herein having a dielectric constant greater than 10 in combination with at least one alternating separate layer of tape or paste having a dielectric constant of less than 10 to form a multi-layer substrate wherein alternating layers have differing dielectric constants.

It is to be understood that each numerical value herein (percentage, temperature, etc.) is presumed to be preceded by "about." In any embodiment herein the dielectric material may comprise different phases, for example crystalline and amorphous in any ratio, for example 1:99 to 99:1, (crystalline:amorphous) expressed in either mol % or wt %. Other ratios include 10:90, 20:80, 30:70, 40:60, 50:50, 60:40, 70:30, 80:20 and 90:10 as well as all values in between. In one embodiment the dielectric paste includes 10-30 wt % crystalline dielectric and 70-90 wt % amorphous dielectric.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

LTCC (Low Temperature Co-fired Ceramic), is a multi-layer, glass ceramic substrate technology which is co-fired with low resistance metal conductors, such as Ag, Au, Pt or Pd, or combinations thereof, at relatively low firing temperatures (less than 1000° C.). Sometimes it is referred to as "Glass Ceramics" because its main composition may consist of glass and alumina or other ceramic fillers. Some LTCC formulations are recrystallizing glasses. Glasses herein may be provided in the form of frits which may be formed in situ or added to a composition. In some situations, base metals such as nickel and its alloys may be used, ideally in non-oxidizing atmospheres, such as oxygen partial pressures of $10^{-12}$ to $10^{-8}$ atmospheres. A "base metal" is any metal other than gold, silver, palladium, and platinum. Alloying metals may include Mn, Cr, Co, and/or Al.

A tape cast from a slurry of dielectric material is cut, and holes known as vias are formed to enable electrical connection between layers. The vias are filled with a conductive paste. Circuit patterns are then printed, along with co-fired resistors as needed. Multiple layers of printed substrates are stacked. Heat and pressure are applied to the stack to bond layers together. Low temperature (<1000° C.) sintering is then undertaken. The sintered stacks are sawn to final dimensions and post fire processing completed as needed.

Multilayer structures useful in automotive applications may have about 5 ceramic layers, for example 3-7 or 4-6. In RF applications, a structure may have 10-25 ceramic layers. As a wiring substrate, 5-8 ceramic layers may be used.

Dielectric Pastes.

A paste for forming the dielectric layers can be obtained by mixing an organic vehicle with a raw dielectric material, as disclosed herein. Also useful are precursor compounds (carbonates, nitrates, sulfates, phosphates) that convert to such oxides and composite oxides upon firing, as stated hereinabove. The dielectric material is obtained by selecting compounds containing these oxides, or precursors of these oxides, and mixing them in the appropriate proportions. The proportion of such compounds in the raw dielectric material is determined such that after firing, the desired dielectric layer composition may be obtained. The raw dielectric material (as disclosed elsewhere herein) is generally used in powder form having a mean particle size of about 0.1 to about 3 microns, and more preferably about 1 micron or less.

Organic Vehicle.

The pastes herein include an organics portion. The organics portion is or includes an organic vehicle, which is a binder in an organic solvent or a binder in water. The choice of binder used herein is not critical; conventional binders such as ethyl cellulose, polyvinyl butanol, ethyl cellulose, and hydroxypropyl cellulose, and combinations thereof are appropriate together with a solvent. The organic solvent is also not critical and may be selected in accordance with a particular application method (i.e., printing or sheeting), from conventional organic solvents such as butyl carbitol, acetone, toluene, ethanol, diethylene glycol butyl ether; 2,2,4-trimethyl pentanediol monoisobutyrate (Texanol®); alpha-terpineol; beta-terpineol; gamma terpineol; tridecyl alcohol; diethylene glycol ethyl ether (Carbitol®), diethylene glycol butyl ether (Butyl Carbitol®) and propylene glycol; and blends thereof, Products sold under the Texanol® trademark are available from Eastman Chemical Company, Kingsport, Tenn.; those sold under the Dowanol® and Carbitol® trademarks are available from Dow Chemical Co., Midland, Mich.

No particular limit is imposed on the organics portion of the dielectric pastes of the invention. In one embodiment the dielectric pastes of the invention include from about 10 wt % to about 40 wt % of the organic vehicle; in another, from about 10 wt % to about 30 wt %. Often the paste contains about 1 to 5 wt % of the binder and about 10 to 50 wt % of the organic solvent, with the balance being the dielectric component (solids portion). In one embodiment, the dielectric paste of the invention includes from about 60 to about 90 wt % of solids portion elsewhere disclosed, and from about 10 wt % to about 40 wt % of the organics portion described in this and the preceding paragraph. If desired, the pastes of the invention may contain up to about 10 wt % of other additives such as dispersants, plasticizers, dielectric compounds, and insulating compounds.

Filler.

In order to minimize expansion mismatch between tape layers of differing dielectric compositions, fillers such as cordierite, alumina, zircon, fused silica, aluminosilicates and combinations thereof may be added to one or more dielectric pastes herein in an amount of 1-30 wt %, preferably 2-20 wt % and more preferably 2-15 wt %.

Firing.

The dielectric stack (two or more layers) is then fired in an atmosphere, which is determined according to the type of conductor in the internal electrode layer-forming paste. Where the internal electrode layers are formed of a base metal conductor such as nickel and nickel alloys, the firing atmosphere may have an oxygen partial pressure of about $10^{-12}$ to about $10^{-8}$ atm. Sintering at a partial pressure lower than about $10^{-12}$ atm should be avoided, since at such low pressures the conductor can be abnormally sintered and may become disconnected from the dielectric layers. At oxygen partial pressures above about $10^{-8}$ atm, the internal electrode layers may be oxidized. Oxygen partial pressures of about $10^{-11}$ to about $10^{-9}$ atm are most preferred. It is also possible to fire the dielectric compositions disclosed herein in ambient air. However, reducing atmospheres ($H_2$, $N_2$ or $H_2/N_2$) can undesirably reduce $B_2O_3$ from a dielectric paste to metallic bismuth.

Applications for the LTCC compositions and devices disclosed herein include band pass filters, (high pass or low pass), wireless transmitters and receivers for telecommunications including cellular applications, power amplifier modules (PAM), RF front end modules (FEM), WiMAX2 modules, LTE-advanced modules, transmission control units (TCU), electronic power steering (EPS), engine management systems (EMS), various sensor modules, radar modules, pressure sensors, camera modules, small outline tuner modules, thin profile modules for devices and components, and IC tester boards. Band-pass filters contain two major parts, one a capacitor and the other an inductor. Low K material is good for designing the inductor, but not suitable for designing a capacitor due the requirement for more active area to generate sufficient capacitance. High K material will result in the opposite. The inventors have discovered that Low K (4-8)/Mid K (10-100) LTCC material can be co-fired and put into a single component, low K materials can be used to design inductor area and high K material can be used to design capacitor area to have optimized performance.

EXAMPLES

The following examples are provided to illustrate preferred aspects of the invention and are not intended to limit the scope of the invention.

As seen in the tables below, appropriate amounts of $BaCO_3$, $WO_3$ and $SiO_2$, are mixed and then milled together in an aqueous medium to a particle size $D_{50}$ of about 0.2 to 1.5 μm. This slurry is dried and calcined at about 800 to 1000° C. for about 1 to 5 hours to form the host material including BaO, $WO_3$ and $SiO_2$. The resultant host material is then mechanically pulverized and mixed with fluxing agents and again milled in an aqueous medium to a particle size $D_{50}$ of about 0.5 to 1.0 μm. The milled ceramic powder is dried and pulverized to produce a finely divided powder. The resultant powder is pressed into cylindrical pellets and fired at a temperature of about 850° C. for about 30 minutes, except formulation 24 is fired at about 880° C. for about 30 minutes. Formulations are given in weight percent.

TABLE 1

Host compositions.

| Host | A | B | C |
|---|---|---|---|
| BaO | 38.313 | 42.133 | 43.583 |
| $WO_3$ | 57.934 | 51.333 | 53.099 |
| $SiO_2$ | 3.573 | 6.534 | 3.318 |

TABLE 2

Dielectric Formulations 1 and 2.

| Formulation | 1 | 2 |
|---|---|---|
| Host A | 85.464 | 85.293 |
| $BaSiO_3$ | 10.990 | 10.968 |
| $BaCO_3$ | 1.570 | 1.567 |
| $H_3BO_3$ | 1.476 | 1.473 |
| LiF | 0.500 | 0.499 |
| CuO | 0.000 | 0.200 |

TABLE 3

Dielectric Formulations 3-9.

| Formulation | 3 | 4 | 5 | 6 | 7 | 8 | 9 |
|---|---|---|---|---|---|---|---|
| Host B | 96.454 | 96.261 | 96.580 | 96.704 | 96.829 | 96.266 | 98.131 |
| $BaCO_3$ | 1.570 | 1.567 | 1.570 | 1.570 | 1.570 | 1.559 | 0.778 |
| $H_3BO_3$ | 1.476 | 1.473 | 1.476 | 1.476 | 1.476 | 1.466 | 0.731 |
| LiF | 0.500 | 0.499 | 0.374 | 0.250 | 0.125 | 0.000 | 0.000 |
| CuO | 0.000 | 0.200 | 0.000 | 0.000 | 0.000 | 0.000 | 0.000 |
| $Li_2CO_3$ | 0.000 | 0.000 | 0.000 | 0.000 | 0.000 | 0.710 | 0.360 |
| $SiO_2$ | 0.000 | 0.000 | 0.000 | 0.000 | 0.000 | 0.000 | 0.000 |

TABLE 4

Dielectric Formulations 10-17.

| Formulation | 10 | 11 | 12 | 13 | 14 | 15 | 16 | 17 |
|---|---|---|---|---|---|---|---|---|
| Host B | 97.208 | 98.165 | 95.800 | 97.686 | 98.306 | 97.898 | 97.792 | 98.587 |
| $BaCO_3$ | 1.720 | 0.516 | 1.552 | 1.118 | 0.783 | 1.743 | 1.431 | 0.700 |
| $H_3BO_3$ | 0.718 | 0.484 | 1.458 | 0.601 | 0.421 | 0.000 | 0.300 | 0.250 |
| LIF | 0.000 | 0.000 | 0.000 | 0.000 | 0.000 | 0.000 | 0.000 | 0.000 |
| CuO | 0.000 | 0.000 | 0.000 | 0.000 | 0.000 | 0.000 | 0.000 | 0.000 |
| $Li_2CO_3$ | 0.354 | 0.360 | 0.718 | 0.357 | 0.250 | 0.359 | 0.358 | 0.358 |
| $SiO_2$ | 0.000 | 0.475 | 0.472 | 0.238 | 0.240 | 0.000 | 0.119 | 0.105 |

TABLE 5

Dielectric Formulations 18-22.

| Formulation | 18 | 19 | 20 | 21 | 22 |
|---|---|---|---|---|---|
| Host C | 97.919 | 93.256 | 97.123 | 92.499 | 88.934 |
| BaCO$_3$ | 1.121 | 1.067 | 1.111 | 1.058 | 1.111 |
| H$_3$BO$_3$ | 0.602 | 0.574 | 0.599 | 0.570 | 0.599 |
| LiF | 0.000 | 0.000 | 0.000 | 0.000 | 0.000 |
| CuO | 0.000 | 0.000 | 0.000 | 0.000 | 0.000 |
| Li$_2$CO$_3$ | 0.358 | 0.341 | 0.356 | 0.339 | 0.356 |
| SiO$_2$ | 0.000 | 4.762 | 0.000 | 0.000 | 0.000 |
| ZrO$_2$ | 0.000 | 0.000 | 0.811 | 0.772 | 0.000 |
| CaTiO$_3$ | 0.000 | 0.000 | 0.000 | 4.762 | 9.000 |

TABLE 6

Dielectric Formulations 23-24.

| Formulation | 23 | 24 |
|---|---|---|
| Host B | 87.7 | 47.473 |
| BaCO$_3$ | 1.28 | 0.694 |
| Li$_2$CO$_3$ | 0.32 | 0.886 |
| H$_3$BO$_3$ | 0.22 | 3.11 |
| SiO$_2$ | 0.09 | 0.05 |
| SrTiO$_3$ | 9.98 | — |
| ZnO | — | 6.33 |
| CuO | 0.43 | 0.5 |
| CaTiO$_3$ | — | 40.957 |

The following Tables 7 and 8 present properties and performance data of the formulations set forth Tables 1-5.

TABLE 7

Density, K & Q data for formulations 1-24:

| Formulation | 1 | 2 | 3 | 4 | 5 | 6 | 7 |
|---|---|---|---|---|---|---|---|
| Fired density g/cc | 5.500 | 5.467 | 5.517 | 5.424 | 5.400 | 5.591 | 5.361 |
| K @ 1 MHz | 8.0 | 7.9 | 7.9 | 8.1 | 7.4 | 7.9 | 7.5 |
| Q @ 1 MHz | 6818 | >50,000 | >50,000 | >50,000 | >50,000 | >50,000 | 271 |

| Formulation | 8 | 9 | 10 | 11 | 12 | 13 | 14 |
|---|---|---|---|---|---|---|---|
| Fired density g/cc | 5.492 | 5.628 | 5.625 | 5.422 | 5.483 | 5.643 | 5.554 |
| K @ 1 MHz | 8.0 | 8.1 | 8.0 | 7.7 | 7.8 | 8.0 | 8.0 |
| Q @ 1 MHz | 5085 | >50,000 | 6522 | 821 | 28571 | >50,000 | >50,000 |

| Formulation | 15 | 16 | 17 | 18 | 19 | 20 | 21 |
|---|---|---|---|---|---|---|---|
| Fired density g/cc | 4.500 | 5.523 | 5.477 | 5.964 | 5.395 | 5.938 | 5.739 |
| K @ 1 MHz | 6.4 | 7.9 | 7.7 | 9.1 | 7.7 | 8.9 | 10.4 |
| Q @ 1 MHz | 89 | >50,000 | >50,000 | 1132 | >50,000 | >50,000 | >50,000 |

| Formulation | 22 | 23 | 24 |
|---|---|---|---|
| Fired Density g/cc | 5.617 | 5.334 | 4.701 |
| K @ 1 MHz | 12.1 | 11 | 45 |
| Q @ 1 MHz | >50,000 | >50,000 | >20,000 |

TABLE 8

TCC Data for formulations 17 and 20-23:

| Formulation | 17 | 20 | 21 | 22 | 23 |
|---|---|---|---|---|---|
| TCC PPM @ −55° C. | P133 | P150 | P069 | N021 | N026 |
| TCC PPM @ 85° C. | P139 | P141 | P078 | P023 | P013 |
| TCC PPM @ 125° C. | P145 | P146 | P087 | P029 | P020 |

Table 9 includes select Dielectric formulations in wt. % after sintering at 850° C. for 30 minutes (formulation 24 is fired at about 880° C. for about 30 minutes):

TABLE 9

| Formulation | 13 | 22 | 23 | 24 |
|---|---|---|---|---|
| BaO | 42.335 | 39.913 | 38.2 | 20.969 |
| WO$_3$ | 50.511 | 47.566 | 45.3 | 24.877 |
| SiO$_2$ | 6.669 | 2.972 | 5.86 | 3.218 |
| SrO | — | — | 5.67 | — |
| CaO | — | 3.739 | — | 17.243 |
| TiO$_2$ | — | 5.326 | 4.37 | 24.568 |
| B$_2$O$_3$ | 0.34 | 0.339 | 0.13 | 1.788 |
| Li$_2$O | 0.145 | 0.145 | 0.13 | 0.365 |
| CuO | — | — | 0.43 | 0.510 |
| ZnO | — | — | — | 6.462 |

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

Further embodiments of the invention are presented in the following Items.

Item 1: A composition comprising a mixture of precursor materials that, upon firing, forms a lead-free and cadmium-free dielectric material comprising a barium-tungsten-silicon oxide host material.

Item 2: The composition according to item 1, wherein the dielectric material exhibits a dielectric constant of 1 to 50.

Item 3: The composition according to item 1, wherein the dielectric material exhibits a dielectric constant of 6 to 45.

Item 4: A host material comprising:
(i) 30-50 wt % BaO,
(ii) 45-65 wt % WO$_3$,
(iii) 1-10 wt % SiO$_2$, (iv) no lead, and
(v) no cadmium.

Item 5: A lead-free and cadmium-free dielectric material comprising, prior to firing:
(a) 80-99.9 wt % of the host material of item 4 together with
(b) 8-13 wt % $BaSiO_3$,
(c) 0.5-3 wt % $BaCO_3$,
(d) 0.5-3 wt % $H_3BO_3$,
(e) 0.1-1 wt % LiF and
(f) 0 to 0.5 wt % CuO,
or oxide equivalents of any of the foregoing.

Item 6: A lead-free and cadmium-free dielectric material comprising, prior to firing:
(a) 90-99.9 wt % of the host material of item 4 together with
(b) 0.2-3 wt % $BaCO_3$,
(c) 10-3 wt % $H_3BO_3$,
(d) 0-1 wt % LiF,
(e) 0-0.5 wt % CuO,
(f) 0-1.5 wt % $Li_2CO_3$,
(g) 0-1 wt % $SiO_2$,
or oxide equivalents of any of the foregoing.

Item 7: A lead-free and cadmium-free dielectric material comprising, prior to firing:
(a) 37-99.7 wt % of the host material of item 4 together with
(b) 0.1-2 wt % $BaCO_3$,
(c) 0.1-5 wt % $H_3BO_3$,
(d) 0 to 1 wt % CuO,
(e) 0.1-2 wt % $Li_2CO_3$,
(f) 0-5 wt % $SiO_2$,
(g) 0-1 wt % $ZrO_2$,
(h) 0-10 wt % ZnO,
(i) 0-15 wt % $SrTiO_3$, and
(j) 0-50 wt % $CaTiO_3$.
or oxide equivalents of any of the foregoing.

Item 8: A lead-free and cadmium-free composition comprising a mixture of precursors that, upon firing, forms a lead-free and cadmium-free dielectric material comprising:
(a) 10-55 wt % BaO,
(b) 15-60 wt % $WO_3$,
(c) 0.5-15 wt % $SiO_2$,
(d) 0-27 wt % CaO,
(e) 0-35 wt % $TiO_2$,
(f) 0-15 wt % SrO,
(g) 0.05-5 wt % $B_2O_3$,
(h) 0.05-5 wt % $Li_2O$,
(i) 0-5 wt % LiF,
(j) 0-5 wt % CuO, and
(k) 0-10 wt % ZnO.

Item 9: The lead-free and cadmium-free dielectric material of any of items 1-8, wherein, after firing, the fired composition exhibits a Q value of at least 20000 when measured at 1 MHz.

Item 10: The lead-free and cadmium-free dielectric material of any of items 1-8, wherein, after firing, the fired composition exhibits a dielectric loss tangent Df of less than 0.00005 when measured at 1 MHz.

Item 11: The lead-free and cadmium-free dielectric material of any of items 1-8, wherein, after firing, the fired composition exhibits a dielectric constant K of 6-45.

Item 12: An electric or electronic component comprising, prior to firing, the lead-free and cadmium-free dielectric material of any of items 1-8, together with a conductive paste comprising:
a. 60-90 wt % Ag+Pd+Pt+Au,
b. 1-10 wt % of an additive selected from the group consisting of silicides, carbides, nitrides, and borides of transition metals,
c. 0.5-10 wt % of at least one glass frit,
d. 10-40 wt % of an organic portion.

Item 13: The electric or electronic component of item 12, wherein the electric or electronic component is selected from the group consisting of high Q resonators, electromagnetic interference filter, band pass filters, wireless packaging systems, and combinations thereof.

Item 14: A method of forming an electronic component comprising:
(a1) applying dielectric composition of any of items 1-8 to a substrate or
(a2) applying a tape comprising the dielectric composition of any of items 1-8 to a substrate or
(a3) compacting a plurality of particles of the dielectric composition of any of items 1-8 to form a monolithic composite substrate; and
(b) firing the substrate at a temperature sufficient to sinter the dielectric material.

Item 15: The method of item 14, wherein the firing is conducted at a temperature of from about 800° C. to about 900° C.

Item 16: The method of item 14, wherein the firing is conducted at a temperature of from about 845° C. to about 885° C.

Item 17: The method of any of items 14-16, wherein the firing is conducted in air.

Item 18: A method of co-firing at least one layer of the dielectric material of any of items 1-8 having a dielectric constant greater than 10 in combination with at least one alternating separate layer of tape or paste having a dielectric constant of less than 10 to form a multi-layer substrate wherein alternating layers have differing dielectric constants.

Item 19: The method of item 18, wherein the firing is conducted at a temperature of from about 800° C. to about 900° C.

Item 20: The method of item 18, wherein the firing is conducted at a temperature of from about 845° C. to about 885° C.

Item 21: The method of any of items 18-20, wherein the firing is conducted in air.

Item 22: A composition comprising a mixture of precursor materials that, upon firing, forms a lead-free and cadmium-free dielectric material comprising a barium-tungsten-silicon oxide host material.

Item 23: The composition according to item 22, wherein the dielectric material exhibits a dielectric constant of 1 to 20.

Item 24: The composition according to item 22, wherein the dielectric material exhibits a dielectric constant of 6 to 12.

Item 25: A host material comprising:
(a) 30-45 wt % BaO,
(b) 50-60 wt % $WO_3$,
(c) 1-10 wt % $SiO_2$,
(d) no lead, and
(e) no cadmium.

Item 26: A lead-free and cadmium-free dielectric composition comprising, prior to firing:
(a) 80-99.9 wt % of the host material of item 4 together with
(b) 8-13 wt % $BaSiO_3$,
(c) 0.5-3 wt % $BaCO_3$,
(d) 0.5-3 wt % $H_3BO_3$,
(e) 0.1-1 wt % LiF and
(f) 0 to 0.5 wt % CuO,
or oxide equivalents of any of the foregoing.

Item 27: A lead-free and cadmium-free dielectric composition comprising, prior to firing:
(a) 90-99.9 wt % of the host material of item 4 together with
(b) 0.5-2 wt % $BaCO_3$,
(c) 1-3 wt % $H_3BO_3$,
(d) 0-1 wt % LiF and
(e) 0 to 0.5 wt % CuO,
(f) 0-1 wt % $Li_2CO_3$,
(g) 0-1 wt % $SiO_2$,
or oxide equivalents of any of the foregoing.

Item 28: A lead-free and cadmium-free dielectric composition comprising, prior to firing:
(a) 87-99.9 wt % of the host material of item 4 together with
(b) 0.8-1.5 wt % $BaCO_3$,
(c) 0.3-1 wt % $H_3BO_3$,
(d) 0-1 wt % LiF,
(e) 0 to 0.5 wt % CuO,
(f) 0.1-0.8 wt % $Li_2CO_3$,
(g) 0-5 wt % $SiO_2$,
(h) 0-1 wt % $ZrO_2$,
(i) –10 wt % $OCaTiO_3$.
or oxide equivalents of any of the foregoing.

Item 29: A lead-free and cadmium-free dielectric composition comprising:
(a) 20-70 wt % BaO,
(b) 20-70 wt % $WO_3$,
(c) 0.1-10 wt % $SiO_2$,
(d) 0-10 wt % CaO,
(e) 0-10 wt % $TiO_2$,
(f) 0.10-5 wt % $B_2O_3$,
(g) 0.1-5 wt % $Li_2O_3$, and
(h) 0.1-5 wt % LiF.

Item 30: The lead-free and cadmium-free dielectric material of any of items 22-29, wherein, after firing, the fired composition exhibits a Q value of at least 20000 when measured at 1 MHz.

Item 31: The lead-free and cadmium-free dielectric material of any of items 22-29, wherein, after firing, the fired composition exhibits a dielectric loss tangent Df of less than 0.00005 when measured at 1 MHz.

Item 32: The lead-free and cadmium-free dielectric material of any of items 22-29, wherein, after firing, the fired composition exhibits a dielectric constant K of 6-12.

Item 33: An electric or electronic component comprising, prior to firing, the lead-free and cadmium-free dielectric material or paste of any of items 22-29, together with a conductive paste comprising:
(a) 60-90 wt % Ag+Pd+Pt+Au,
(b) 1-10 wt % of an additive selected from the group consisting of silicides, carbides, nitrides, and borides of transition metals,
e. 0.5-10 wt % of at least one glass frit,
f. 10-40 wt % of an organic portion.

Item 34: The electric or electronic component of item 33, wherein the electric or electronic component is selected from the group consisting of high Q resonators, band pass filters, wireless packaging systems, and combinations thereof.

Item 35: A method of forming an electronic component comprising:
(a1) applying dielectric composition of any of items 22-29 to a substrate or
(a2) applying a tape comprising the dielectric composition of any of items 22-29 to a substrate or
(a3) compacting a plurality of particles of the dielectric composition of any of items 22-29 to form a monolithic composite substrate; and
(f) firing the substrate at a temperature sufficient to sinter the dielectric material.

Item 36: The method of item 35, wherein the firing is conducted at a temperature of from about 800° C. to about 900° C.

Item 37: The method of item 35, wherein the firing is conducted at a temperature of from about 825° C. to about 875° C.

Item 38: The method of any of items 35-37, wherein the firing is conducted in air.

Item 39: A method of co-firing at least one layer of the dielectric material of any of items 22-29 in combination with at least one alternating separate layer of tape or paste having a dielectric constant of greater than 12 to form a multi-layer substrate wherein alternating layers have differing dielectric constants.

Item 40: The method of item 39, wherein the firing is conducted at a temperature of from about 800° C. to about 900° C.

Item 41: The method of item 39, wherein the firing is conducted at a temperature of from about 825° C. to about 875° C.

Item 42: The method of any of items 39-41, wherein the firing is conducted in air.

Item 43: A lead-free and cadmium-free dielectric composition comprising, prior to firing:
(a) 85-99 wt % of the host material of item 4 together with
(b) 0.7-1.7 wt % $BaCO_3$,
(c) 0.1-1 wt % $H_3BO_3$,
(d) 0.1-1 wt % LiF,
(e) 0 to 0.7 wt % CuO,
(f) 0.1-0.8 wt % $Li_2CO_3$,
(g) 0.01-6 wt % $SiO_2$,
(h) 4-13 wt % $SrTiO_3$,
or oxide equivalents of any of the foregoing.

Item 44: A lead-free and cadmium-free dielectric composition comprising:
(a) 20-70 wt % BaO,
(b) 20-70 wt % $WO_3$,
(c) 0.1-10 wt % $SiO_2$,
(d) 1-15 wt % SrO,
(e) 0.1-10 wt % $TiO_2$,
(f) 0.1-5 wt % $B_2O_3$,
(g) 0.1-5 wt % $Li_2O$, and
(h) 0.1-1 wt % CuO.

The invention claimed is:
1. A fired lead-free and cadmium-free dielectric material comprising, prior to firing:
(a) 80-90.9 wt % of a calcined host material comprising:
(i) 30-50 wt % BaO,
(ii) 45-65 wt % $WO_3$,
(iii) 1-10 wt % $SiO_2$,
(iv) no lead, and
(v) no cadmium,
(b) 8-13 wt % $BaSiO_3$,
(c) 0.5-3 wt % $BaCO_3$,
(d) 0.5-3 wt % $H_3BO_3$,
(e) 0.1-1 wt % LiF, and
(f) 0 to 0.5 wt % CuO,
or oxide equivalents of any of the foregoing.

2. A fired lead-free and cadmium-free dielectric material comprising, prior to firing:
   (a) 90-99.8 wt % of a calcined host material comprising:
      (i) 30-50 wt % BaO,
      (ii) 45-65 wt % $WO_3$,
      (iii) 1-10 wt % $SiO_2$,
      (iv) no lead, and
      (v) no cadmium,
   (b) 0.2-3 wt % $BaCO_3$,
   (c) 0-3 wt % $H_3BO_3$,
   (d) 0-1 wt % LiF,
   (e) 0-0.5 wt % CuO,
   (f) 0-1.5 wt % $Li_2CO_3$, and
   (g) 0-1 wt % $SiO_2$,
   or oxide equivalents of any of the foregoing.

3. A fired lead-free and cadmium-free dielectric material comprising, prior to firing:
   (a) 37-99.7 wt % of a calcined host material comprising:
      (i) 30-50 wt % BaO,
      (ii) 45-65 wt % $WO_3$,
      (iii) 1-10 wt % $SiO_2$,
      (iv) no lead, and
      (v) no cadmium,
   (b) 0.1-2 wt % $BaCO_3$,
   (c) 0.1-5 wt % $H_3BO_3$,
   (d) 0 to 1 wt % CuO,
   (e) 0.1-2 wt % $Li_2CO_3$,
   (f) 0-5 wt % $SiO_2$,
   (g) 0-1 wt % $ZrO_2$,
   (h) 0-10 wt % ZnO,
   (i) 0-15 wt % $SrTiO_3$, and
   (j) 0-50 wt % $CaTiO_3$,
   or oxide equivalents of any of the foregoing.

4. A fired electric or electronic component comprising the lead-free and cadmium-free dielectric material of claim 1, together with a conductive paste comprising:
   a. 60-90 wt % Ag+Pd+Pt+Au,
   b. 1-10 wt % of an additive selected from the group consisting of silicides, carbides, nitrides, and borides of transition metals,
   c. 0.5-10 wt % of at least one glass frit, and
   d. 10-40 wt % of an organic portion.

5. The fired electric or electronic component of claim 4, wherein the electric or electronic component is selected from the group consisting of high Q resonators, electromagnetic interference filter, band pass filters, wireless packaging systems, and combinations thereof.

6. A fired multi-layer electronic component comprising at least one first layer of the dielectric material of claim 1 having a dielectric constant greater than 10 in combination with at least one alternating separate layer of having a dielectric constant of less than 10 wherein alternating layers have differing dielectric constants.

7. A fired lead-free and cadmium-free dielectric composition comprising, prior to firing:
   (a) 80-90.9 wt % of a calcined host material comprising:
      (i) 30-45 wt % BaO,
      (ii) 50-60 wt % $WO_3$,
      (iii) 1-10 wt % $SiO_2$,
      (iv) no lead, and
      (v) no cadmium,
   (b) 8-13 wt % $BaSiO_3$,
   (c) 0.5-3 wt % $BaCO_3$,
   (d) 0.5-3 wt % $H_3BO_3$,
   (e) 0.1-1 wt % LiF, and
   (f) 0 to 0.5 wt % CuO,
   or oxide equivalents of any of the foregoing.

8. A fired lead-free and cadmium-free dielectric composition comprising, prior to firing:
   (a) 90-98.5 wt % of a calcined host material comprising
      (i) 30-45 wt % BaO,
      (ii) 50-60 wt % $WO_3$,
      (iii) 1-10 wt % $SiO_2$,
      (iv) no lead, and
      (v) no cadmium,
   (b) 0.5-2 wt % $BaCO_3$,
   (c) 1-3 wt % $H_3BO_3$,
   (d) 0-1 wt % LiF,
   (e) 0 to 0.5 wt % CuO,
   (f) 0-1 wt % $Li_2CO_3$, and
   (g) 0-1 wt % $SiO_2$,
   or oxide equivalents of any of the foregoing.

9. A fired lead-free and cadmium-free dielectric composition comprising, prior to firing:
   (a) 87-98.9 wt % of a calcined host material comprising:
      (i) 30-50 wt % BaO,
      (ii) 45-65 wt % $WO_3$,
      (iii) 1-10 wt % $SiO_2$,
      (iv) no lead, and
      (v) no cadmium,
   (b) 0.8-1.5 wt % $BaCO_3$,
   (c) 0.3-1 wt % $H_3BO_3$,
   (d) 0-1 wt % LiF,
   (e) 0 to 0.5 wt % CuO,
   (f) 0.1-0.8 wt % $Li_2CO_3$,
   (g) 0-5 wt % $SiO_2$,
   (h) 0-1 wt % $ZrO_2$, and
   (i) 0-10 wt % $CaTiO_3$,
   or oxide equivalents of any of the foregoing.

10. A fired lead-free and cadmium-free dielectric composition comprising:
    (a) 20-70 wt % BaO,
    (b) 20-70 wt % $WO_3$,
    (c) 0.1-10 wt % $SiO_2$,
    (d) 0-10 wt % CaO,
    (e) 0-10 wt % $TiO_2$,
    (f) 0.10-5 wt % $B_2O_3$,
    (g) 0.1-5 wt % $Li_2O$, and
    (h) 0.1-5 wt % LiF.

11. A fired electric or electronic component comprising the lead-free and cadmium-free dielectric material of claim 10, together with a conductive paste comprising:
    (a) 60-90 wt % Ag+Pd+Pt+Au,
    (b) 1-10 wt % of an additive selected from the group consisting of silicides, carbides, nitrides, and borides of transition metals,
    (c) 0.5-10 wt % of at least one glass frit,
    (d) 10-40 wt % of an organic portion.

12. The fired electric or electronic component of claim 11, wherein the electric or electronic component is selected from the group consisting of high Q resonators, band pass filters, wireless packaging systems, and combinations thereof.

* * * * *